(12) United States Patent
Coffinberry

(10) Patent No.: US 8,789,376 B2
(45) Date of Patent: Jul. 29, 2014

(54) FLADE DUCT TURBINE COOLING AND POWER AND THERMAL MANAGEMENT

(75) Inventor: George Albert Coffinberry, West Chester, OH (US)

(73) Assignee: General Electric Company, Schenectady, NY (US)

( * ) Notice: Subject to any disclaimer, the term of this patent is extended or adjusted under 35 U.S.C. 154(b) by 445 days.

(21) Appl. No.: 13/117,607

(22) Filed: May 27, 2011

(65) Prior Publication Data

US 2012/0297789 A1  Nov. 29, 2012

(51) Int. Cl.
| | | |
|---|---|---|
| F02C 7/12 | (2006.01) | |
| F02C 7/143 | (2006.01) | |
| F02C 6/08 | (2006.01) | |
| F01D 25/12 | (2006.01) | |
| F01D 25/08 | (2006.01) | |

(52) U.S. Cl.
CPC .............. *F01D 25/12* (2013.01); *Y02T 50/675* (2013.01); *F01D 25/08* (2013.01)
USPC .............. 60/806; 60/39.83; 60/785; 60/226.1

(58) Field of Classification Search
USPC ............. 60/226.1, 226.3, 262, 266, 782, 785, 60/806, 39.83
See application file for complete search history.

(56) References Cited

U.S. PATENT DOCUMENTS

| | | | |
|---|---|---|---|
| 4,741,152 A | 5/1988 | Burr et al. | |
| 4,776,536 A | 10/1988 | Hudson et al. | |
| 5,402,638 A * | 4/1995 | Johnson | 60/204 |
| 6,415,595 B1 | 7/2002 | Wilmot, Jr. et al. | |
| 7,140,174 B2 | 11/2006 | Johnson | |
| 7,216,475 B2 * | 5/2007 | Johnson | 60/226.1 |
| 7,260,926 B2 | 8/2007 | Sabatino et al. | |
| 7,395,657 B2 | 7/2008 | Johnson | |
| 7,481,214 B2 | 1/2009 | Eilers | |
| 7,608,131 B2 | 10/2009 | Jensen | |
| 7,624,592 B2 | 12/2009 | Lui et al. | |
| 7,770,381 B2 | 8/2010 | Johnson et al. | |
| 2005/0109016 A1 * | 5/2005 | Ullyott | 60/282 |
| 2008/0110603 A1 | 5/2008 | Fellague et al. | |
| 2010/0107603 A1 | 5/2010 | Smith | |
| 2010/0170262 A1 | 7/2010 | Kaslusky et al. | |
| 2011/0088405 A1 | 4/2011 | Turco | |

* cited by examiner

*Primary Examiner* — Andrew Nguyen
(74) *Attorney, Agent, or Firm* — General Electric Co.; Steven J. Rosen

(57) ABSTRACT

An aircraft compound cooling system includes a power thermal management system for cooling one or more aircraft components, an air cycle system, a vapor cycle system, and a turbine cooling circuit for cooling bleed air and cooling turbine components in a high pressure turbine in the engine.

An air to air FLADE duct heat exchanger is disposed in a FLADE duct of the engine and a valving apparatus is operable for selectively switching the FLADE duct heat exchanger between the turbine cooling circuit and the air cycle system. A vapor cycle system includes a vapor cycle system condenser that may be in heat transfer cooling relationship with the air cycle system. An air cycle system heat exchanger and an engine burn fuel to air heat exchanger in the vapor cycle system condenser may be used for cooling a working fluid in a refrigeration loop of the vapor cycle system.

22 Claims, 3 Drawing Sheets

FLADE DUCT TURBINE COOLING AND POWER AND THERMAL MANAGEMENT

BACKGROUND OF THE INVENTION

1. Technical Field

The present invention relates generally to aircraft gas turbine engine and aircraft cooling and, more specifically, to such systems for cooling aircraft power and thermal management systems and gas turbine engine turbines.

2. Background Information

Military aircraft designs are being developed with engines that will operate at much higher overall pressure ratios than today's engines. Cooling air for hot sections of the engine's turbine, particularly, the high pressure turbine will be needed. It is known to use compressor air to cool the turbine such as disclosed in U.S. Pat. Nos. 4,187,675, 4,254,618, 7,823,389. Cooling air for aircraft avionics and other airframe cooling requirements may also be supplied by the compressor. The Lockheed F35 has included integrated power and cooling systems also referred to as power and thermal management systems which use compressor air.

U.S. Pat. No. 7,624,592 discloses a power and cooling management system configured to flexibly couple various adaptive modules to an integrated power and cooling unit to suit any aircraft platform is provided. The integrated power and cooling unit has a compressor(s), power turbine(s), cooling turbine(s) and integral starter generator(s) mounted to the shaft of the power and cooling turbine. The integrated power and cooling unit may be pneumatically and/or pneumatically coupled to an adaptive module that comprises an additional compressor and an additional turbine or electrically coupled to a fuel cell which provides the main power after entering the full operation mode. When the engine includes an integral starter generator mounted thereto, the integral starter generator of the integrated power and cooling unit is operative to receive electric power from the engine mounted generator. Alternatively, a motor/generator may be mounted to the shaft of the additional turbine of the adaptive module.

Other examples of integrated power and cooling systems discussed in U.S. Pat. No. 7,624,592 include U.S. Pat. Nos. 4,684,081, 4,494,372, 4,684,081, 4,503,666, 5,442,905, 5,490,645, 6,415,595, and 6,845,630. The inventors of U.S. Pat. No. 7,624,592 found that these designs were complex and wanted to reduce the complexity of the engine configuration and its integrated power and cooling systems.

Typically, these cooling systems use fan cooling air.

Thus, there is a need to supply cool compressor air for both turbine and avionics and other aircraft or airframe required cooling. There is also a need to make such a cooling system as simple and light weight with a minimal effect on fuel specific fuel consumption (SFC) as possible.

BRIEF DESCRIPTION OF THE INVENTION

An aircraft compound cooling system includes a power thermal management system with an air cycle system, a turbine cooling circuit for cooling pressurized bleed air and using the cooled pressurized bleed air for cooling turbine components in a high pressure turbine in an aircraft gas turbine engine, an air to air FLADE duct heat exchanger disposed in a FLADE duct of the engine, and valving apparatus operable for selectively switching the air to air FLADE duct heat exchanger between the turbine cooling circuit and the air cycle system.

An exemplary embodiment of the aircraft compound cooling system further includes the air cycle system in heat transfer cooling relationship with a vapor cycle system condenser in the vapor cycle system. An engine burn fuel to air heat exchanger may be in heat transfer cooling relationship with the vapor cycle system condenser.

An air cycle system heat exchanger may be incorporated in the vapor cycle system condenser and be used for cooling a working fluid in a refrigeration loop of the vapor cycle system with cooling air from the air cycle system. The engine burn fuel to air heat exchanger is operable for cooling the working fluid in the refrigeration loop of the vapor cycle system with engine burn fuel.

The vapor cycle system may be operably connected to and for cooling an environmental control system for cooling liquid and/or air cooled aircraft components.

The air cycle system may include an air cycle machine having a power turbine drivingly connected to a machine compressor and a cooling turbine of the air cycle machine. An intercooler including the FLADE duct heat exchanger is operably disposed in serial airflow relationship between a machine compressor outlet of the machine compressor and a cooling turbine inlet of the cooling turbine. The air cycle system heat exchanger is operably disposed in serial airflow relationship between a cooling turbine outlet of the cooling turbine and a machine compressor inlet of machine compressor and the power turbine is connected to and in pressurized air receiving relationship with a compressor stage of an aircraft gas turbine engine high pressure compressor such as a compressor discharge stage.

The exemplary embodiment of the aircraft compound cooling system further includes inlet and outlet lines leading to and from the air to air FLADE duct heat exchanger respectively. The valving apparatus includes inlet and outlet valves connected to the inlet and outlet lines respectively. The compressor discharge stage is operably connected by a bleed line to a first inlet of the inlet valve and the compressor outlet of the machine compressor is operably connected by a compressor outflow line to a second inlet of the inlet valve. The inlet line to the air to air FLADE duct heat exchanger is operably connected to an outlet of the inlet valve and an outlet line from the air to air FLADE duct heat exchanger is operably connected to a valve inlet of the outlet valve. The turbine cooling circuit is operably connected to a first outlet of the outlet valve. A bypass line may operably connect a first bypass outlet of the inlet valve to a second bypass outlet of the outlet valve.

A wire-wound induction magnet generator may be on a shaft connecting the power turbine to the machine compressor and the cooling turbine.

The cooling turbine components in a high pressure turbine may include first stage turbine blades.

DETAILED DESCRIPTION OF THE INVENTION

Figure 1:
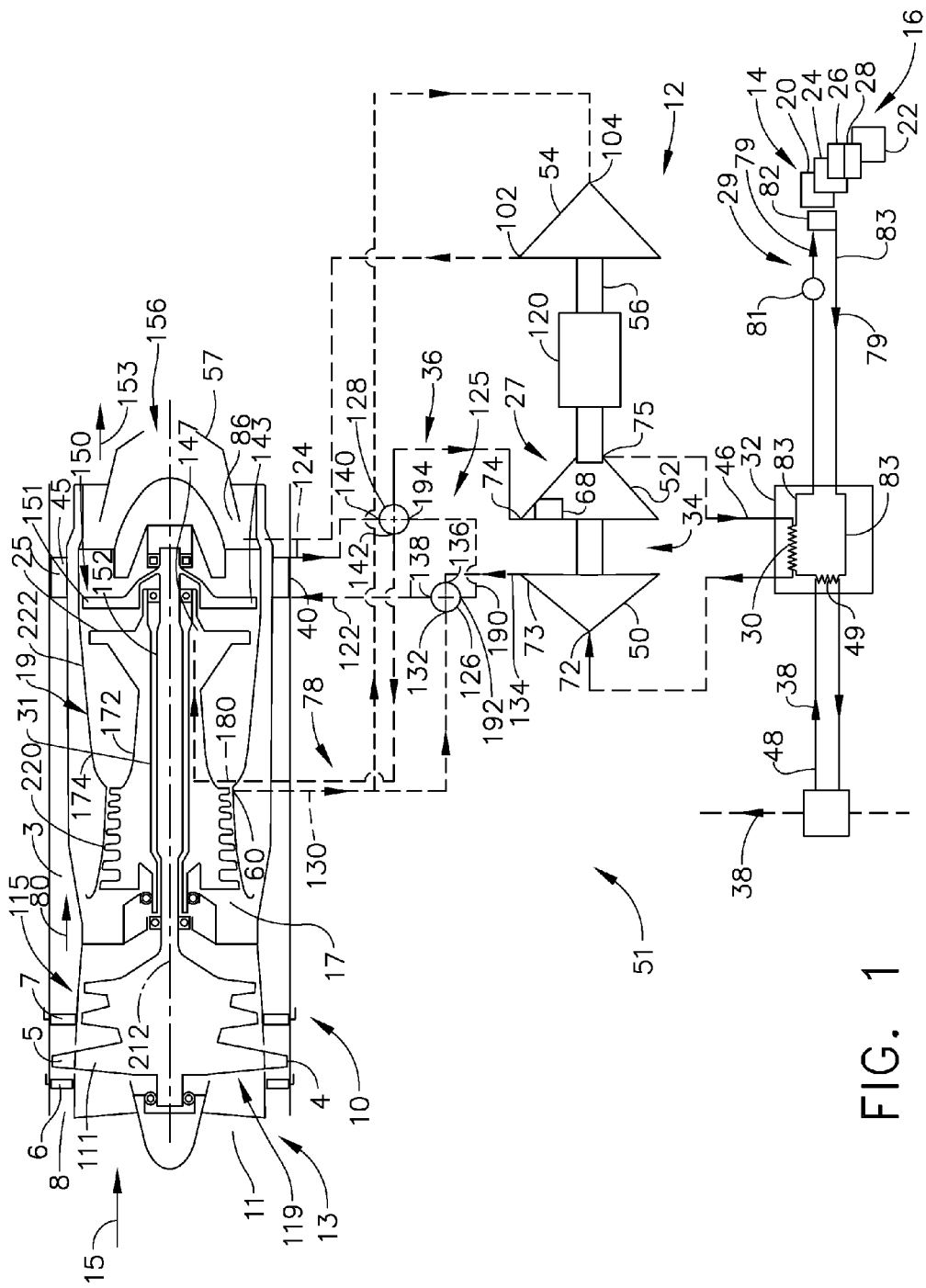
FIG. 1 is a diagrammatical view illustration of a gas turbine engine powered aircraft having a compound cooling system using a heat exchanger mounted in a FLADE duct operable to alternatively cool air for turbine cooling or aircraft component cooling.
Figure 2:
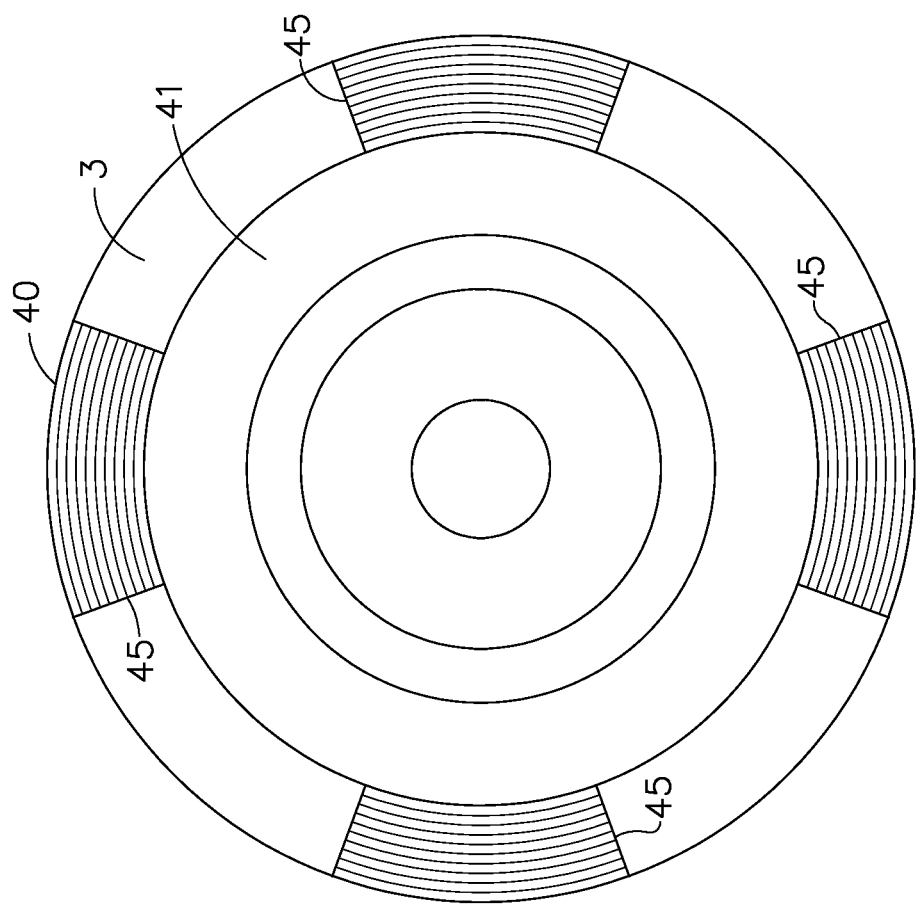
FIG. 2 is diagrammatical view of duct heat exchanger elements distributed around and in a FLADE duct of the engine illustrated in FIG. 1.

Illustrated diagrammatically in FIG. 1 is an exemplary aircraft FLADE gas turbine engine 10 including an air to air FLADE duct heat exchanger 40 disposed in a FLADE duct 3 of the engine 10. The heat exchanger 40 may include heat exchanger sections 45 distributed around the FLADE duct 3 as illustrated in FIG. 2. A compound cooling system 51 uses the air to air FLADE duct heat exchanger 40 to alternatively cool compressor air for turbine cooling or cooling air for aircraft component cooling. The compound cooling system 51 is operable to cool hot pressurized bleed air 58 for cooling turbine components in a high pressure turbine 23 of the engine 10 or alternatively switched to cool cooling air 46 for use in an air cycle system 27 used to cool a power thermal management system (PTMS) 12. The pressurized bleed air 58 is bled from a compressor discharge stage 60 of a high pressure compressor 64 of the aircraft gas turbine engines 10. The FLADE duct 3 is a good location for the duct heat exchanger 40 because there is typically fewer FLADE stages than fan stages and so the FLADE duct airflow is cooler.

Referring to FIG. 1, a turbine cooling circuit 78 directs the pressurized bleed air 58 from the compressor discharge stage 60, through the FLADE duct heat exchanger 40, and into the high pressure turbine 23 of the engine 10.

Pressurized bleed air 58 from the compressor discharge stage 60 is often referred to as CDP air or bleed. CDP is a well known acronym for compressor discharge pressure. The power thermal management system 12 includes an air cycle system ACS 27. The ACS 27 includes an air cycle machine (ACM) 34 and an intercooler 36 including the air to air duct heat exchanger 40. The ACS 27 is used to provide cooling for liquid and/or air cooled aircraft components 16 and equipment as well as thermal control and pressurization for the cockpit through what is often referred to as an environmental control system (ECS) 14. Exemplary cooled aircraft components 16 include directed energy weapons (DEW) 20, avionics 22, alternating current (A/C) electronics 24, onboard inert gas generation systems (OBIGGS) 26, and onboard oxygen gas generation systems (OBOGS) 28.

The turbine cooling circuit 78 cools pressurized bleed air 58 and uses the cooled pressurized bleed air 58 for cooling turbine components in the high pressure turbine 23. The power thermal management system 12 uses cooling air 46 in an the cycle system 27 used cool the environmental control system 14. Valving apparatus 125 selectively switches the air to air FLADE duct heat exchanger 40 between the turbine cooling circuit 78 and the air cycle system 27.

A FLADE engine (FLADE being an acronym for "fan on blade") is one particular type of variable cycle engines characterized by an outer fan driven by a radially inner fan and discharging its FLADE air into an outer fan duct which is generally co-annular with and circumscribes an inner fan duct circumscribing the inner fan. One such engine, disclosed in U.S. Pat. No. 4,043,121, entitled "Two Spool Variable Cycle Engine", by Thomas et al., provides a FLADE fan and outer fan duct within which variable guide vanes control the cycle variability by controlling the amount of air passing through the FLADE outer fan duct.

FLADE engines are capable of maintaining an essentially constant inlet airflow over a relatively wide range of thrust at a given set of subsonic flight ambient conditions such as altitude and flight Mach No. in order to avoid spillage drag and to do so over a range of flight conditions. This capability is particularly needed for subsonic part power engine operating conditions. Examples of these are disclosed in U.S. Pat. No. 5,404,713, entitled "Spillage Drag and Infrared Reducing FLADE Engine", U.S. Pat. No. 5,402,963, entitled "Acoustically Shielded Exhaust System for High Thrust Jet Engines", U.S. Pat. No. 5,261,227, entitled "Variable Specific Thrust Turbofan Engine", and European Patent No. EP0,567,277, entitled "Bypass Injector Valve For Variable Cycle Aircraft Engines". U.S. Pat. No. 7,395,657, entitled "Flade gas turbine engine with fixed geometry inlet" is incorporated herein by reference.

The engine 10 includes a fan section 115 having a three stage fan 119 and a FLADE fan 4 having at least one row of FLADE fan blades 5 extending radially across the FLADE duct 3. The FLADE fan 4 and FLADE fan blades 5 are disposed radially outwardly of, connected to, and circumscribed about the fan 119. An engine inlet 13 includes a fan inlet 11 to the fan section 115 and an annular FLADE inlet 8 to the FLADE duct 3. FLADE airflow 80 is exhausted by the FLADE fan blades 5. The row of FLADE fan blades 5 is disposed radially outwardly of, operably connected to, and driven by a first fan stage 111 of the three stage fan 119. The row of FLADE fan blades 5 is disposed between an axially forward row of variable first FLADE vanes 6 and, optionally, an axially aft row of variable second FLADE vanes 7.

Downstream and axially aft of the fan 119 is a core engine 19 having an annular core engine inlet 17. A fan bypass duct 41 located downstream and axially aft of the fan 119 circumscribes the core engine 19. The FLADE duct 3 circumscribes the fan 119 and the fan bypass duct 41. The fan inlet 11 is sized to receive essentially full engine airflow 15 of the engine at full power conditions with the FLADE inlet 8 essentially closed off by closing the variable first FLADE vanes 6 and the variable second FLADE vanes 7. The engine is further designed and operated to fully open the inlet of the FLADE duct 3 at predetermined part power flight conditions and essentially close it at full power conditions such as take-off.

The core engine 19 includes, in downstream serial axial flow relationship, a high pressure compressor 220, a combustor 222, and the high pressure turbine 23 having a row of high pressure turbine blades 25. A high pressure shaft 31, disposed coaxially about the centerline 212 of the engine 10, fixedly interconnects the high pressure compressor 220 and the high pressure turbine blades 25. The core engine 19 is effective for generating combustion gases.

Pressurized air from the high pressure compressor 220 is mixed with fuel in the combustor 222 and ignited, thereby, generating combustion gases. Some work is extracted from these gases by the high pressure turbine blades 25 which drives the high pressure compressor 220. The high pressure shaft 31 rotates the high pressure compressor 220.

The combustion gases are discharged from the core engine 19 into a low pressure turbine section 150 having a low pressure turbine 151. The low pressure turbine 151 is drivingly connected to the fan 119 by a low pressure shaft 152. The FLADE fan blades 5 are primarily used to flexibly match inlet airflow requirements. Engine exhaust flow 153 from the low pressure turbine section 150, the FLADE duct 3, and the fan bypass duct 41 is exhausted through an exhaust nozzle 156.

The air to air FLADE duct heat exchanger 40 is operable to cool the hot pressurized bleed air 58 from the compressor discharge stage 60 and exhaust it as pressurized cooling air 179. Alternatively, the air to air FLADE duct heat exchanger 40 is operable to cool cooling air 46 in the intercooler 36 of the ACS 27 for the air cycle machine (ACM) 34.

Figure 3:
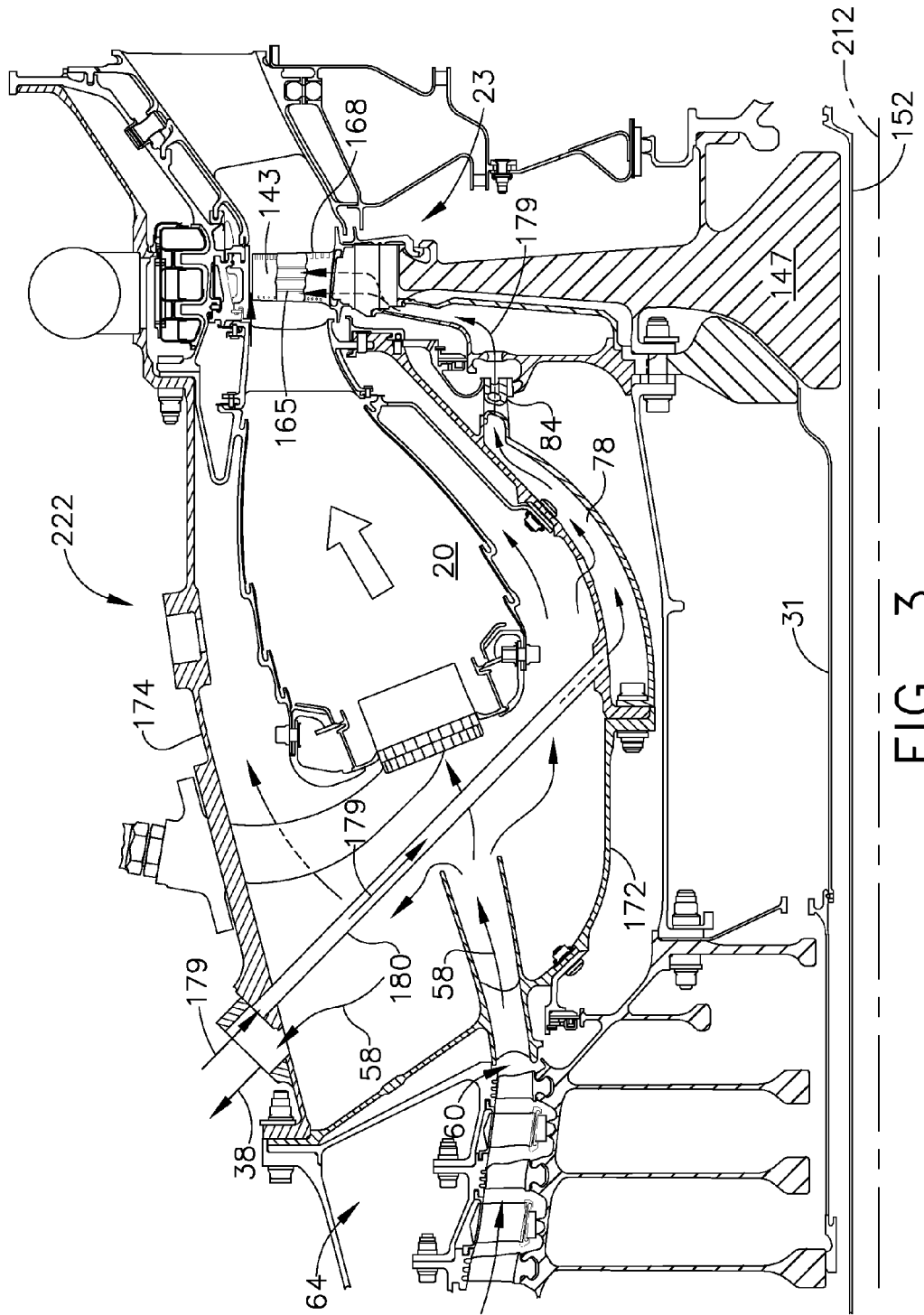
FIG. 3 is a more detailed view illustration of an exemplary turbine cooling system illustrated in FIG. 1.

Referring to FIGS. 1 and 3, the turbine cooling circuit 78 bleeds the hot pressurized bleed air 58 from the compressor discharge stage 60, flows the hot pressurized bleed air 58 to the air to air FLADE duct heat exchanger 40 for cooling to form the pressurized cooling air 179, and flows the cool pressurized air 179 to a plurality of circumferentially spaced apart transfer tubes 180 extending radially through inner and outer combustor casings 172, 174 of the combustor 222. The plurality of circumferentially spaced apart transfer tubes 180 are part of the turbine cooling circuit 78. The pressurized cooling air 179 is then flowed to an annular flow inducer 84 which then directs the pressurized cooling air 179 to a row of first stage turbine blades 143 extending radially outwardly from their supporting rotor disk 147 in the high pressure turbine. The first stage turbine blades 143 are examples of turbine components in a high pressure turbine 23 that may be cooled by the turbine cooling circuit 78.

The flow inducer 84 is a stationary component typically including a row of vanes which tangentially accelerates, meters, and/or further pressurizes the pressurized cooling air 179 and injects the pressurized cooling air 179 into a rotating first stage rotor disk 147. This is a conventional component for efficiently channeling and metering the pressurized cooling air 179 to the axial dovetail slots of the disk 147 for flow into the inlets found in the dovetails of the turbine blades 143. The pressurized cooling air 179 flows radially outwardly through the turbine blades 143 and cooling channels 165 therein and is discharged through the several rows of discharge holes 168 in the pressure and suction sides of the blade airfoil.

Referring to FIG. 1, the environmental control system (ECS) 14 is cooled by the air cycle system ACS 27 and a vapor cycle system (VCS) 29. The ACS 27 includes an air cycle machine (ACM) 34 and the intercooler 36 including the an air to air duct heat exchanger 40. The intercooler 36 is used to cool cooling air 46 cooled by the ACM 34. An air cycle system heat exchanger 30 in the air cycle system ACS 27 is used to help cool the vapor cycle system (VCS) 29.

The duct heat exchanger 40 is used to cool cooling air 46 flowing between a machine compressor 50 and a cooling turbine 52 of the ACM 34. The cooling air 46 is directed from the machine compressor 50, through the intercooler 36, into the cooling turbine 52. The cooling air 46 exiting the cooling turbine 52 is then used to cool a working fluid 79 in a vapor cycle system (VCS) condenser 32 of the VCS 29. The working fluid 79 may be a well known refrigerant such as R-134a.

The VCS 29 further includes a VCS compressor 81 and a VCS evaporator 82. The working fluid 79 is recirculated in a refrigeration loop 83 from the VCS condenser 32 to the VCS compressor 81 to VCS evaporator 82 which cools air used for cooling the aircraft components 16 and then back to the VCS condenser 32. The air cycle system heat exchanger 30 in the ACS 27 may be used in the vapor cycle system condenser 32 for cooling the working fluid 79 in the refrigeration loop 83 with the cooling air 46 exiting the cooling turbine 52.

An engine burn fuel to air heat exchanger 49 is also used to cool the working fluid 79 in the vapor cycle system condenser 32 in the VCS 29. The engine burn fuel to air heat exchanger 49 is in thermal communication with engine burn fuel 38 used to fuel the aircraft gas turbine engines 10. The engine fuel to air heat exchanger 49 is in a polyalphaolefin (PAO) loop 48 which is used cool the working fluid 79 recirculating in the refrigeration loop 83.

The engine burn fuel to air heat exchanger 49 is illustrated as being in the VCS condenser 32 but could located elsewhere for cooling the working fluid 79.

The ACM 34 includes an ACM power turbine 54 for driving the machine compressor 50 and the cooling turbine 52 through a shaft 56. The ACM power turbine 54 is powered by pressurized bleed air 58 from the compressor discharge stage 60 of the high pressure compressor 64 of the aircraft gas turbine engines 10. The pressurized bleed air 58 from the compressor discharge stage 60 flows into a power turbine inlet 102 of the power turbine 54. The pressurized bleed air 58 exhausted through a power turbine outlet 104 from the ACM power turbine 54 and is dumped into engine exhaust 86 upstream of a throat 57 in the exhaust nozzle 156.

The exemplary ACM 34 illustrated herein includes an centrifugal machine compressor 50 including a machine compressor inlet 72 and a compressor outlet 73, a radial inflow cooling turbine 52 including a cooling turbine inlet 74 and a cooling turbine outlet 75, and a radial inflow ACM power turbine 54. The air cycle system heat exchanger 30 in the ACS 27 is operably disposed in airflow relationship between the cooling turbine outlet 75 and the machine compressor inlet 72. The exemplary cooling turbine 52 illustrated herein has a fixed cooling turbine nozzle 68, but it may be a variable nozzle to maintain the machine compressor on its operating line for stall margin.

The ACM 34 may also include a generator 120 on the same shaft 56 drives as the machine compressor 50 and the cooling turbine 52. The generator 120 provides electrical power for starting the engine 10 when the ACS 27 operates as an APU (auxiliary power unit). Generator starting magnetic induction current is supplied from a battery (not shown). On a 2-engine aircraft, this APU function might not be needed so long as the engine can be started with a ground cart. The generator 120 may alternatively be an electrical starter/generator.

The compound cooling system 51 includes inlet and outlet lines 122, 124 leading to and from the air to air FLADE duct heat exchanger 40 respectively. Three way inlet and outlet valves 126, 128 to inlet and outlet lines 122, 124 provide an exemplary valving apparatus 125 for selectively switching the air to air FLADE duct heat exchanger 40 between the turbine cooling circuit 78 and the air cycle system 27. The compressor discharge stage 60 is connected by a bleed line 130 to a first inlet 132 of the inlet valve 126. The compressor outlet 73 of the machine compressor 50 is connected by a compressor outflow line 134 to a second inlet 136 of the inlet valve 126. The inlet line 122 to the air to air FLADE duct heat exchanger 40 is connected to an outlet 138 of the inlet valve 126.

An outlet line 124 from the air to air FLADE duct heat exchanger 40 is connected to a valve inlet 140 of the outlet valve 128. The plurality of circumferentially spaced apart transfer tubes 180 extending radially through the inner and outer combustor casings 172, 174 of the high pressure compressor 220 illustrated in FIG. 3 are connected to a first outlet 142 of the outlet valve 128.

A bypass line 190 connects a first bypass outlet 192 of the inlet valve 126 to a second bypass inlet 194 of the outlet valve 128. The bypass line 190 enables the turbine cooling circuit 78 to direct the pressurized bleed air 58 from the compressor discharge stage 60 and into the high pressure turbine of the engine 10 while bypassing the FLADE duct heat exchanger 40 when the compound cooling system 51 is switched to cool cooling air 46 for use in a power thermal management system (PTMS) 12. The bypass line 190 also enables the power thermal management system (PTMS) 12 to direct the cooling air 46 from the compressor outlet 73 of the compressor 50 and into to a radial inflow cooling turbine 52 including the cooling turbine inlet 74 of the cooling turbine 52 while bypassing the FLADE duct heat exchanger 40 when the compound cooling system 51 is switched to cool the hot pressurized bleed air 58 for cooling turbine components in the high pressure turbine of the engine 10.

Cooling available to the ACM 34 from the air to air FLADE duct heat exchanger 40 is cutoff during high power flight when there is a large amount of the engine burn fuel 38 flowing through the engine fuel to air heat exchanger 49, thus, providing a great deal of cooling for the vapor cycle system 29. During high power flight conditions, the hot pressurized bleed air 58 from the compressor discharge stage 60 is cooled in the FLADE duct heat exchanger 40 and flowed as pressurized cooling air 179 to the turbine cooling circuit 78. This is particularly useful because the turbine components cooled by the pressurized cooling air 179 are subject to very high temperature conditions during high power flight conditions.

During lower power flight conditions, the turbine is not subject to as high temperature conditions and the air to air FLADE duct heat exchanger 40 is switched into the air cycle system 27. During lower power flight conditions, there is less engine burn fuel 38 flowing through the engine fuel to air heat exchanger 49, thus, the air to air FLADE duct heat exchanger 40 provides a great deal of cooling for the vapor cycle system 29.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. An aircraft compound cooling system comprising:
    a power thermal management system including an air cycle system,
    a turbine cooling circuit for cooling pressurized bleed air and using the cooled pressurized bleed air for cooling turbine components in a high pressure turbine in an aircraft gas turbine engine,
    an air to air FLADE duct heat exchanger disposed in a FLADE duct of the engine,
    valving apparatus operable for selectively switching the air to air FLADE duct heat exchanger between the turbine cooling circuit and the air cycle system, and
    a vapor cycle system including a vapor cycle system condenser and the air cycle system in heat transfer cooling relationship with the vapor cycle system condenser.

2. The aircraft compound cooling system as claimed in claim 1 further comprising an engine burn fuel to air heat exchanger in heat transfer cooling relationship with the vapor cycle system condenser.

3. The aircraft compound cooling system as claimed in claim 2 further comprising:
    an air cycle system heat exchanger in the vapor cycle system condenser,
    the air cycle system heat exchanger operable for cooling a working fluid in a refrigeration loop of the vapor cycle system with cooling air from the air cycle system, and
    the engine burn fuel to air heat exchanger operable for cooling the working fluid in the refrigeration loop of the vapor cycle system with engine burn fuel.

4. The aircraft compound cooling system as claimed in claim 3 further comprising the vapor cycle system operably connected to and for cooling an environmental control system for cooling liquid and/or air cooled aircraft components.

5. The aircraft compound cooling system as claimed in claim 4 further comprising:
    the air cycle system further including an air cycle machine having a power turbine drivingly connected to a machine compressor and a cooling turbine of the air cycle machine,
    an intercooler including the FLADE duct heat exchanger operably disposed in serial airflow relationship between a machine compressor outlet of the machine compressor and a cooling turbine inlet of the cooling turbine,
    the air cycle system heat exchanger operably disposed in serial airflow relationship between a cooling turbine outlet of the cooling turbine and a machine compressor inlet of the machine compressor, and
    the power turbine connected to and in pressurized air receiving relationship with a compressor stage of an aircraft gas turbine engine high pressure compressor.

6. The aircraft compound cooling system as claimed in claim 5 wherein the compressor stage is a compressor discharge stage.

7. The aircraft compound cooling system as claimed in claim 6 further comprising:
    inlet and outlet lines leading to and from the air to air FLADE duct heat exchanger respectively,
    the valving apparatus including inlet and outlet valves connected to the inlet and outlet lines respectively,
    the compressor discharge stage operably connected by a bleed line to a first inlet of the inlet valve,
    the compressor outlet of the machine compressor operably connected by a compressor outflow line to a second inlet of the inlet valve,
    the inlet line to the air to air FLADE duct heat exchanger operably connected to an outlet of the inlet valve,
    the outlet line from the air to air FLADE duct heat exchanger operably connected to a valve inlet of the outlet valve, and
    the turbine cooling circuit operably connected to a first outlet of the outlet valve.

8. The aircraft compound cooling system as claimed in claim 7 further comprising a bypass line operably connecting a first bypass outlet of the inlet valve to a second bypass inlet of the outlet valve.

9. The aircraft compound cooling system as claimed in claim 8 further comprising a shaft connecting the power turbine to the machine compressor and the cooling turbine and a wire-wound induction magnet generator on the shaft.

10. The aircraft compound cooling system as claimed in claim 8 further comprising the cooling turbine components in a high pressure turbine including first stage turbine blades.

11. The aircraft compound cooling system as claimed in claim 1 further comprising:
    an air cycle system heat exchanger in the vapor cycle system condenser,
    the air cycle system heat exchanger operable for cooling a working fluid in a refrigeration loop of the vapor cycle system with cooling air from the air cycle system, and
    the vapor cycle system operably connected to and for cooling an environmental control system for cooling liquid and/or air cooled aircraft components.

12. The aircraft compound cooling system as claimed in claim 11 further comprising:
    the air cycle system further including an air cycle machine having a power turbine drivingly connected to a machine compressor and a cooling turbine of the air cycle machine,
    an intercooler including the FLADE duct heat exchanger operably disposed in serial airflow relationship between a machine compressor outlet of the machine compressor and a cooling turbine inlet of the cooling turbine,
    the air cycle system heat exchanger operably disposed in serial airflow relationship between a cooling turbine outlet of the cooling turbine and a machine compressor inlet of the machine compressor, and the power turbine connected to and in pressurized air receiving relationship with a compressor discharge stage of an aircraft gas turbine engine high pressure compressor.

13. The aircraft compound cooling system as claimed in claim 12 further comprising:
inlet and outlet lines leading to and from the air to air FLADE duct heat exchanger respectively,
the valving apparatus including inlet and outlet valves connected to the inlet and outlet lines respectively,
the compressor discharge stage operably connected by a bleed line to a first inlet of the inlet valve,
the compressor outlet of the machine compressor operably connected by a compressor outflow line to a second inlet of the inlet valve,
the inlet line to the air to air FLADE duct heat exchanger operably connected to an outlet of the inlet valve,
the outlet line from the air to air FLADE duct heat exchanger operably connected to a valve inlet of the outlet valve,
the turbine cooling circuit operably connected to a first outlet of the outlet valve, and
a bypass line operably connecting a first bypass outlet of the inlet valve to a second bypass inlet of the outlet valve.

14. An aircraft compound cooling system comprising:
aircraft FLADE gas turbine engine including a fan section having a fan,
a core engine having an annular core engine inlet disposed downstream and axially aft of the fan,
a fan bypass duct downstream and axially aft of the fan circumscribing the core engine,
a FLADE duct circumscribing the fan and the fan bypass duct,
a FLADE fan having at least one row of FLADE fan blades extending radially across the FLADE duct,
the FLADE fan blades disposed radially outwardly of and connected to and circumscribing the fan,
a power thermal management system including an air cycle system,
a turbine cooling circuit for cooling pressurized bleed air and using the cooled pressurized bleed air for cooling turbine components in a high pressure turbine in the aircraft gas turbine engine,
an air to air FLADE duct heat exchanger disposed in the FLADE duct,
valving apparatus operable for selectively switching the air to air FLADE duct heat exchanger between the turbine cooling circuit and the air cycle system, and
a vapor cycle system including a vapor cycle system condenser and the air cycle system in heat transfer cooling relationship with the vapor cycle system condenser.

15. The aircraft compound cooling system as claimed in claim 14 further comprising an engine burn fuel to air heat exchanger in heat transfer cooling relationship with the vapor cycle system condenser.

16. The aircraft compound cooling system as claimed in claim 15 further comprising:
an air cycle system heat exchanger in the vapor cycle system condenser,
the air cycle system heat exchanger operable for cooling a working fluid in a refrigeration loop of the vapor cycle system with cooling air from the air cycle system, and
the engine burn fuel to air heat exchanger operable for cooling the working fluid in the refrigeration loop of the vapor cycle system with engine burn fuel.

17. The aircraft compound cooling system as claimed in claim 16 further comprising the vapor cycle system operably connected to and for cooling an environmental control system for cooling liquid and/or air cooled aircraft components.

18. The aircraft compound cooling system as claimed in claim 16 further comprising:
the air cycle system further including an air cycle machine having a power turbine drivingly connected to a machine compressor and a cooling turbine of the air cycle machine,
an intercooler including the FLADE duct heat exchanger operably disposed in serial airflow relationship between a machine compressor outlet of the machine compressor and a cooling turbine inlet of the cooling turbine,
the air cycle system heat exchanger operably disposed in serial airflow relationship between a cooling turbine outlet of the cooling turbine and a machine compressor inlet of the machine compressor, and
the power turbine connected to and in pressurized air receiving relationship with a compressor discharge stage of an aircraft gas turbine engine high pressure compressor.

19. The aircraft compound cooling system as claimed in claim 18 further comprising:
inlet and outlet lines leading to and from the air to air FLADE duct heat exchanger respectively,
the valving apparatus including inlet and outlet valves connected to the inlet and outlet lines respectively,
the compressor discharge stage operably connected by a bleed line to a first inlet of the inlet valve,
the compressor outlet of the machine compressor operably connected by a compressor outflow line to a second inlet of the inlet valve,
the inlet line to the air to air FLADE duct heat exchanger operably connected to an outlet of the inlet valve,
the outlet line from the air to air FLADE duct heat exchanger operably connected to a valve inlet of the outlet valve, and
the turbine cooling circuit operably connected to a first outlet of the outlet valve.

20. The aircraft compound cooling system as claimed in claim 19 further comprising a bypass line operably connecting a first bypass outlet of the inlet valve to a second bypass inlet of the outlet valve.

21. The aircraft compound cooling system as claimed in claim 20 further comprising a shaft connecting the power turbine to the machine compressor and the cooling turbine and a wire-wound induction magnet generator on the shaft.

22. The aircraft compound cooling system as claimed in claim 21 further comprising the cooling turbine components in a high pressure turbine including first stage turbine blades.

* * * * *